United States Patent
Estes et al.

(10) Patent No.: US 9,089,149 B2
(45) Date of Patent: Jul. 28, 2015

(54) POULTRY CHILLER WITH MULTI-BLADE LONG-PITCH AUGER

(71) Applicant: Cooling & Applied Technology, Inc., Russellville, AR (US)

(72) Inventors: Jeremy B. Estes, London, AR (US); Michael E. Miller, Hattieville, AR (US)

(73) Assignee: Cooling & Applied Technology, Inc., Russellville, AR (US)

( * ) Notice: Subject to any disclaimer, the term of this patent is extended or adjusted under 35 U.S.C. 154(b) by 0 days.

(21) Appl. No.: 14/211,608

(22) Filed: Mar. 14, 2014

(65) Prior Publication Data

US 2014/0262152 A1    Sep. 18, 2014

Related U.S. Application Data

(60) Provisional application No. 61/798,286, filed on Mar. 15, 2013.

(51) Int. Cl.
*A22C 21/00*    (2006.01)

(52) U.S. Cl.
CPC ..................... *A22C 21/00* (2013.01)

(58) Field of Classification Search
CPC ........................... A22C 21/00; A22C 21/0061
USPC ............ 165/87, 86, 89, 90; 99/516, 517, 536; 134/25.3
See application file for complete search history.

(56) References Cited

U.S. PATENT DOCUMENTS

2014/0202659 A1*    7/2014    SEKIGUCHI et al. ......... 165/85

FOREIGN PATENT DOCUMENTS

| AU | 2007221962 | * | 4/2009 |
| JP | 2008 295446 | * | 12/2008 |

OTHER PUBLICATIONS

Machine Translation JP 2008-295446.*

* cited by examiner

*Primary Examiner* — Nina Bhat
(74) *Attorney, Agent, or Firm* — Richard Blakely Glasgow

(57) ABSTRACT

An auger-type poultry chiller having an auger with multiple long-pitch auger blades. The blades of the auger create pockets that spiral around the auger shaft and extend the length of the auger. While the product in the chiller is locked into a certain pocket, it is not locked into a certain spot lengthwise in the chiller. The product, therefore, is able to distribute evenly along the length of the chiller within its pocket even if there are gaps in loading time or if unloading stops momentarily.

25 Claims, 4 Drawing Sheets

POULTRY CHILLER WITH MULTI-BLADE LONG-PITCH AUGER

CROSS-REFERENCE TO RELATED APPLICATIONS

This application claims the benefit of U.S. Provisional Application No. 61/798,286, entitled "Poultry Chiller with Multi-Blade Long-Pitch Auger" and filed on Mar. 15, 2013. The complete disclosure of said provisional patent application is hereby incorporated by reference.

STATEMENT REGARDING FEDERALLY SPONSORED RESEARCH OR DEVELOPMENT

Not applicable

BACKGROUND OF THE INVENTION

1. Field of the Invention

The present invention relates to an auger-type poultry chiller and, in particular, to a poultry chiller having an auger with multiple long-pitch blades around the auger shaft causing increased cooling and agitation of the poultry carcasses in the chiller.

2. Brief Description of the Related Art

After evisceration, slaughtered poultry carcasses must be rapidly chilled to preserve the quality of the meat. Various types of poultry chillers are known in the art, but one common type is an auger-type poultry chiller. Auger-type chillers are typically in the form of semi-cylindrical tanks filled with chilled water. The carcasses are placed in one end of the tank and moved to the other end by a rotating auger. In order to prevent clumping of the carcasses and to obtain good contact between the poultry carcasses and the chilled water, the chilled water may be agitated by various means, including air bubbles. While the prior art techniques for agitating the chilled water can provide sufficient agitation in some circumstances to achieve good contact between the carcasses and the chilled water, and to minimize clumping of the carcasses, a more effective technique is needed. A drawback of the prior art auger chillers is that the poultry carcasses are locked into one flight of the auger as they move through the chiller. For this reason, it is commonly seen that one flight of a chiller is overloaded while the chiller as a whole is relatively empty. The exception is when the carcasses flow over the top of the auger and move from one flight to the next. This can cause one flight to be loaded too heavily and also influence how long the carcasses remain in the chiller before exiting.

The limitations of the prior art are overcome by the present invention as described below.

BRIEF SUMMARY OF THE INVENTION

The invention is directed to an auger-type poultry chiller having an auger with multiple blades and having a pitch much longer than the short pitch augers of the prior art chillers. For example, where a typical auger blade makes one full revolution about every 4 feet in a standard 60-100 foot chiller, each blade on the auger of the present invention makes one full revolution in about 25 feet.

The multi-blade long-pitch auger is able to move poultry carcasses (also referred as "product") from the entrance or inlet end of the chiller to the unload or outlet end very quickly compared to the prior art chillers because pitch determines the rate of travel of the carcasses through the chiller. When the carcasses get to the outlet end, some of the product exits via an unloader and unload chute, while the rest of the product remains rotating with the auger unlike in the prior art chillers. The blades of the auger create pockets around the auger that spiral around the auger shaft. Each pocket that is created by the multiple long-pitch blades of the auger extends the length of the auger. As a result, the product cannot cross between the pockets. The advantage of this feature is that while the product is locked into a certain pocket, it is not locked into a certain spot lengthwise in the chiller and is therefore free to move along the length of the auger within its pocket. The product, therefore, is able to distribute evenly along the length of the chiller within its pocket even if there are gaps in loading time or if unloading stops momentarily.

This auger design allows the water level to be raised substantially inside the chiller. In a prior art chiller with a typical auger, the water level is commonly maintained slightly above the top of the auger shaft so that the carcasses do not flow over the top of the shaft and move from one flight to another. With the present invention, the water level can be raised to the top of the chiller and product cannot flow from one flight to another. This gives the chiller a much larger chilled water holding capacity compared to the same sized prior art chiller.

Use of the present auger design also causes extra agitation and water flow to help cool the product faster. As the auger rotates, the product will continuously be moving forward and backward inside its pocket within the chiller due to the long pitch of the auger. This feature helps in agitating the product so there is always water flow around the product. As a result, the carcasses are kept from clumping together and having warmer carcasses in the middle of the clump.

These and other features, objects and advantages of the present invention will become better understood from a consideration of the following detailed description of the preferred embodiments in conjunction with the drawings as described following:

DETAILED DESCRIPTION OF THE INVENTION

Figure 1:
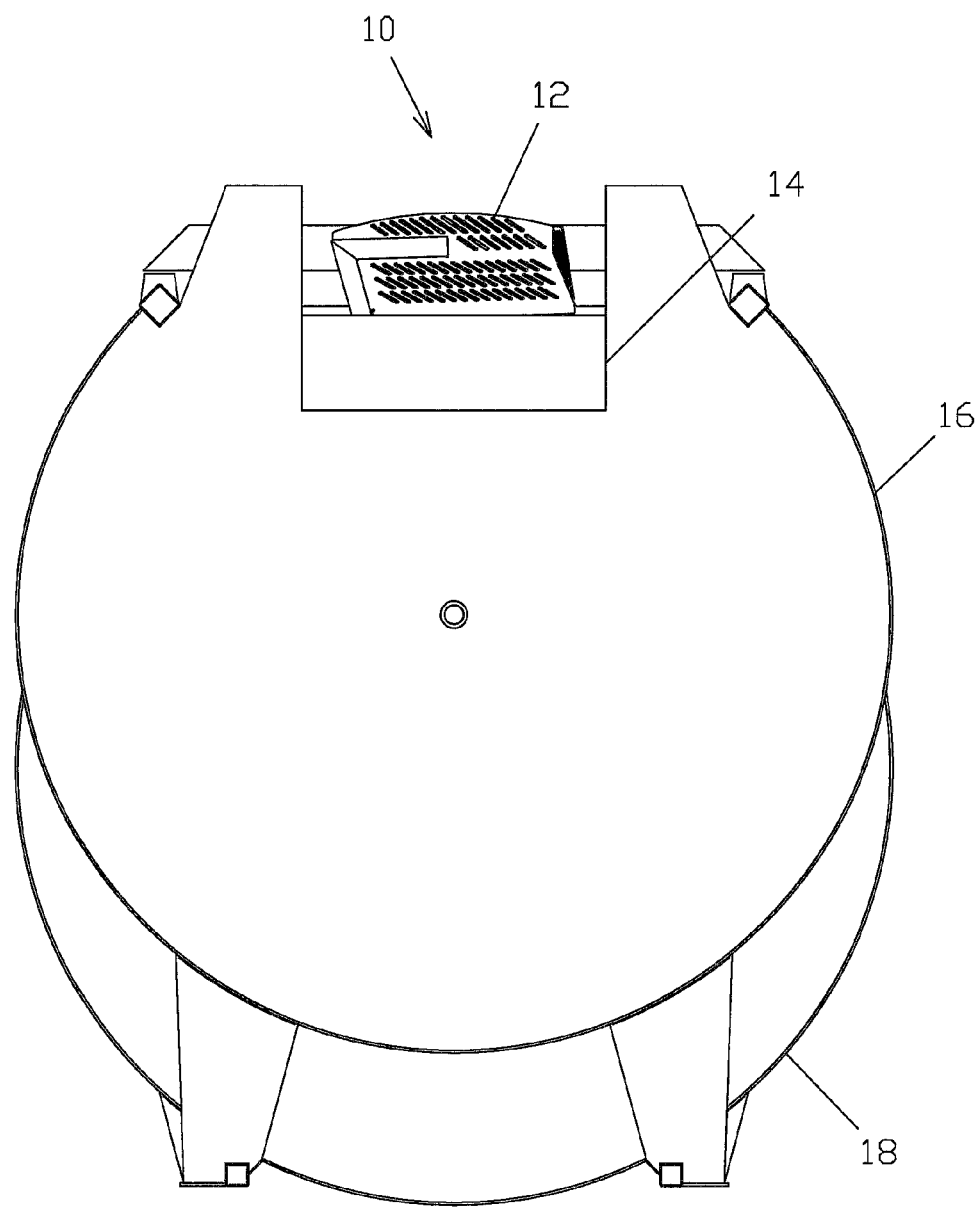
FIG. 1 is an end view of the unloader section of the chiller of the present invention.
Figure 2:
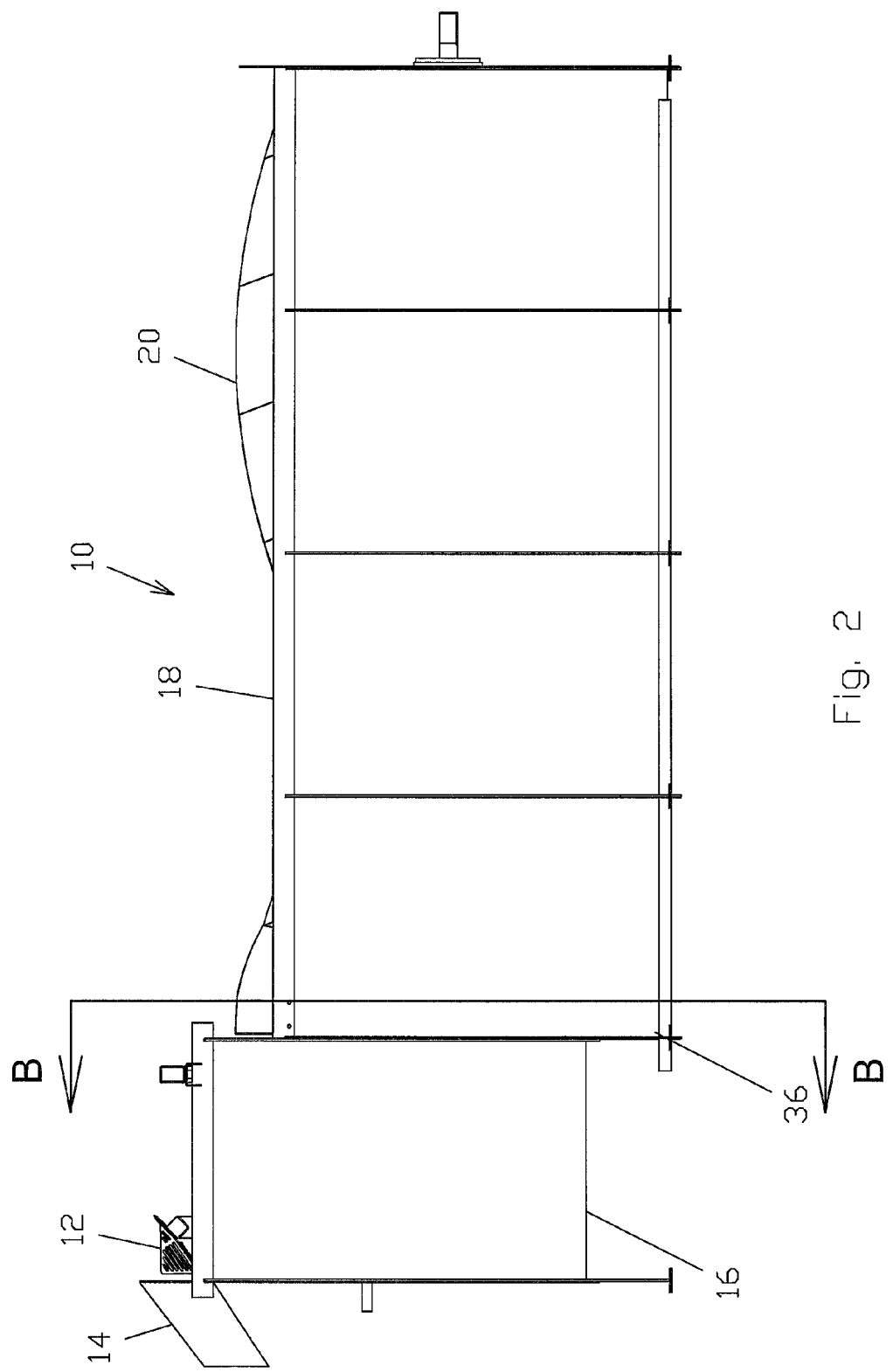
FIG. 2 is a side elevational view of the chiller of the present invention.
Figure 3:
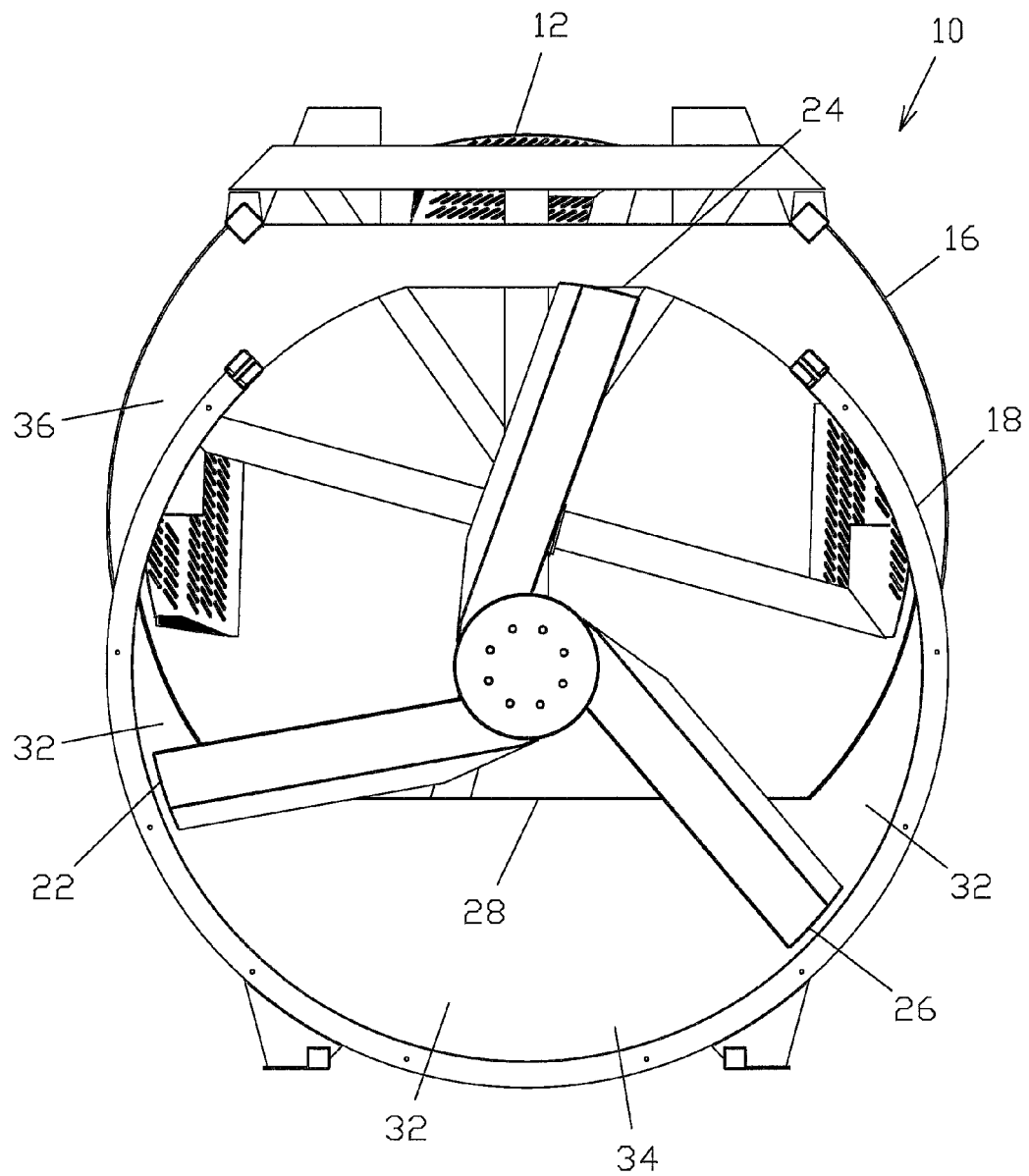
FIG. 3 is sectional view of the auger section of the present invention taken along line B-B of FIG. 2 and looking into the unloader section of the chiller.
Figure 4:
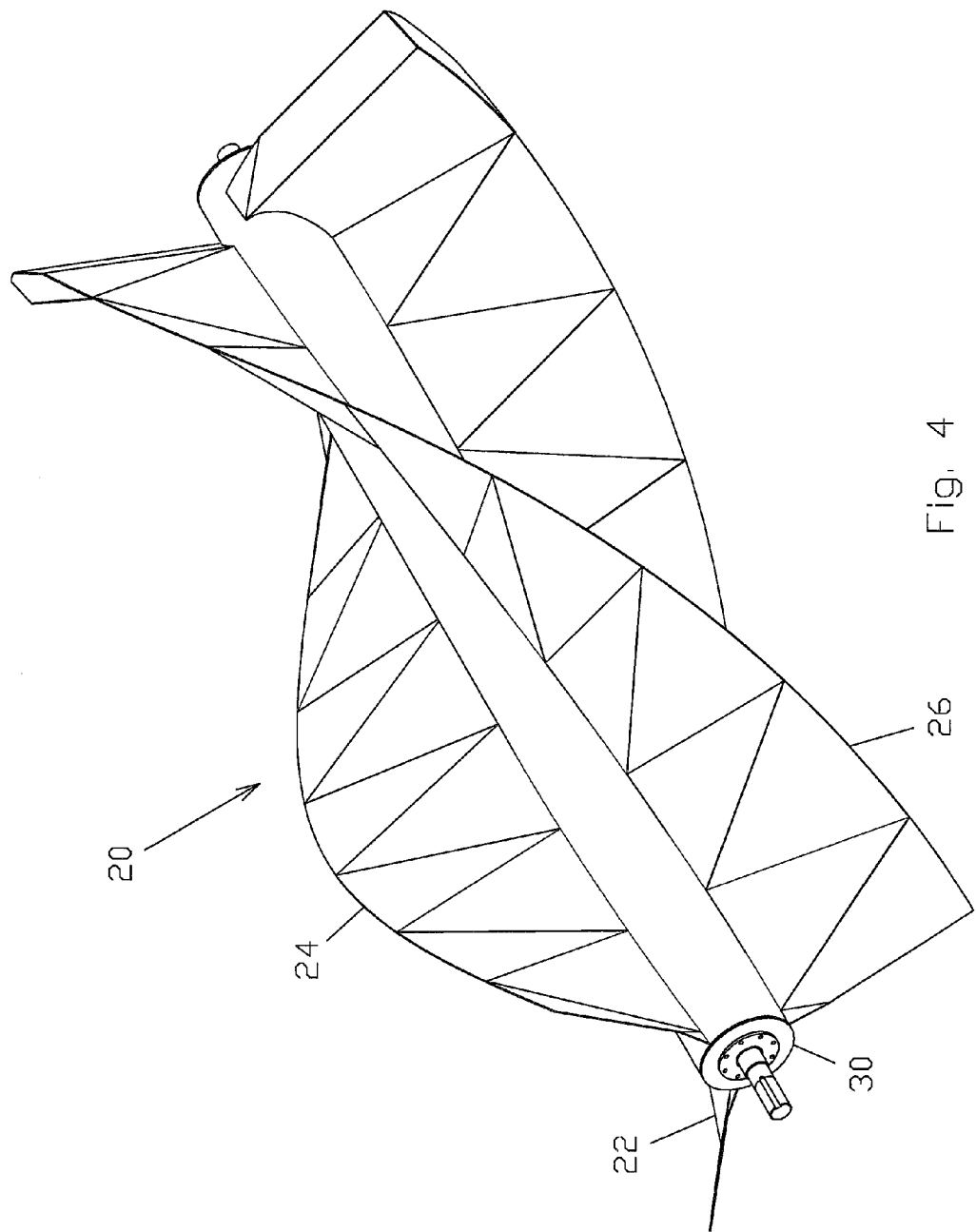
FIG. 4 is a perspective view of the multi-blade long-pitch auger of the present invention.

With reference to FIGS. 1-4, the preferred embodiments of the present invention may be described. The invention is directed to an auger-type chiller 10 having an auger 20 mounted for rotated within a semi-cylindrical tank 36 filled with chilled water 34. The auger 20 has multiple blades 22, 24, 26 having a pitch. The pitch is the distance between corresponding points on consecutive turns of the auger flighting. The pitch of the auger of the present invention is much longer the single blade augers in the prior art chillers. For example, where the prior art auger blade makes one full revolution in about 4 feet, each blade of the auger of the present invention makes one full revolution in about 25 feet. While the preferable pitch of the auger will depend upon the diameter of the tank of the chiller, the pitch of the auger is preferably 15-40 feet. As shown in FIG. 4, the auger 20 includes a shaft 30 supporting multiple blades 22, 24, 26 that spiral around it. Since the auger has such a long pitch, the blades function more as horizontal dividers forming lengthwise pockets through the tank than the vertical dividers of the prior art augers that prevent product from moving from one pocket to another pocket either in front or behind it.

The poultry chiller 10 includes a tank 36 having an auger section 18 and an unloader section 16. The auger section 18 of the tank includes the multi-blade, long-pitch auger 20. The auger 20 protrudes through the open top of the auger section 18 and above the auger section 18 on the tank 36 as shown in FIG. 2. The auger 20 is preferably the length and diameter of the auger section 18 of the tank 36. As shown in FIG. 3, the outer edges of the auger 20 conform closely with the inner walls of the auger section 18 of the tank. The unloader section 16 of the tank is elevated in relation to the auger section. The unloader section 16 includes an unloader with unload paddles 12 and an unload chute 14 at the exit end of the tank. The unload paddles 12 rotate and are used to lift the product up and out of the chilled water 34. The product then slides off the unload paddles 12 into, through, and out of the unload chute 14. The unloader and unload chute are preferably of the type well-known to those skilled in the art.

Product is dropped into the top of the chiller 10 at an inlet end of the auger section 18 of the tank 36. As the carcasses are dropped in the chiller, they fall into a pocket 32, which is the space formed between two of the auger blades 22, 24, 26 and the inner surface of the tank. The number of pockets 32 corresponds to the number of auger blades attached to the auger shaft 30. The number of auger blades can vary, however, the auger 20 preferably has three auger blades. As a result, the tank preferably includes three pockets 32. Like the auger blades, the pockets 32 spiral around the auger shaft 30 and run lengthwise through the auger section 18 of the tank 36. Each pocket 32 that is created by the long-pitch auger 20 extends the length of the auger and thus the product cannot cross between the various pockets 32. The advantage of this feature is that while the product is locked into a certain pocket, it is not locked into a certain spot lengthwise in the chiller. The product therefore is free to move along the length of the auger. As a result, product distributes evenly along the length of the chiller within its pocket even if there are gaps in loading time or if unloading stops momentarily. Product will stay inside the pockets 32 until it exits into the unloader section 16 of the tank 36.

As the auger 20 rotates, one of the three pockets is always at the bottom of the chiller. The pocket at the bottom of the chiller at any even time will always be moving towards the unloader section 16 of the tank of the chiller. With the long pitch of the auger blades, the auger 20 will try to push product toward the unloader section 16 of the tank 36 very quickly, but friction will limit the speed of the product and the auger blades will act as paddles to agitate the product. The product moves towards the unloader section 16 of the tank 36, but it does not move as fast as the pocket 32 moves toward the unloader section 16. This is because, in addition to being urged towards the unloader section 16 by the auger blades, the product will also rotate around the auger 20 while in the pocket 32 as a result of the pitch of the auger blades. Rotating around the auger slows the movement of the product towards the unloader section 16 of the tank 36 because the product is not advancing forward when it is rotating around the auger. Product in a prior art chiller with a short pitch auger does not rotate around the auger.

For example, when the auger 20 is rotating clockwise, the product is elevated with a blade 24. Once that blade 24 rotates enough that is it above the auger shaft 30, the product will begin to slide down the spiral blade 24 and fall to the blade 26 positioned below it. After the product moves to the next blade 26, the angle of the blade allows the product to slightly slide back towards the inlet end of the tank 36 as a result of the spiral wrap of the auger blades around the auger shaft 30. This creates a washing effect to clean the product as it moves through the chilled water 34 and to also create agitation to help cool the product and keep it from clumping together.

The chilled water 34 in the tank 36 is preferably raised to the top of the tank 36. Due to raising the water level to the top of the tank, the unloader section 16 of the tank 36 must be raised. The unloader section 16 is semi-cylindrical just like the auger section 18 of the tank. The unload paddles 12 rotate inside the unloader section 16 in an arc that is slightly less than the tank diameter. This leaves only a small amount of clearance so that there is no metal-to-metal contact between the paddles 12 and the tank 36. Since the unloader section 16 and the auger section 18 of the tank are the same diameter, the unloader section 16 is elevated from the auger section 18 so that the unload paddles 12 will be sufficiently above the water level to let product exit the without letting the chilled water 34 exit as well.

By elevating the unloader section 16, the auger blades 22, 24, 26 must lift product from the auger section 18 when it reaches the unloader section 16 and cause the product to slide from the auger blades 22, 24, 26 into the unloader section 16. There is a baffle plate 28 between the auger section 18 and the unloader section 16 of the tank. The baffle plate 28 extends upwardly from the bottom of the tank 36. The auger blades lift the product above the baffle plate 28 to allow the product to slide into the unloader section 16. Enough product must travel from the auger section 18 to the unloader section 16 after each auger blade passes by the baffle plate 28 to maintain a sufficient unloading rate until the next auger blade brings a new supply of product into the unloader section 16.

In one embodiment, the chiller 10 utilizes a control system to determine and monitor how much product needs to be removed from the chiller 10 and when it needs to be removed. This is based on how much product has been put into the chiller 10 and the preferable dwell time of the product for adequate cooling.

The present invention has been described with reference to certain preferred and alternative embodiments that are intended to be exemplary only and not limiting to the full scope of the present invention.

We claim:

1. A poultry chiller, comprising:
    a tank for receiving poultry carcasses and holding chilled water, wherein said tank comprises an inner wall surface and an outer wall surface, wherein said tank comprises an inlet end and an outlet end; and
    an auger mounted in said tank, wherein said auger is comprised of a shaft and a first auger blade, a second auger blade, and a third auger blade attached to said shaft,
    wherein said first auger blade, said second auger blade, and said inner wall surface of said tank forms a first spiral pocket that extends from said inlet end of said tank, wherein said second auger blade, said third auger blade, and said inner wall surface of said tank forms a second spiral pocket that extends from said inlet end of said tank, wherein said third auger blade, said first auger blade, and said inner wall surface of said tank forms a third spiral pocket that extends from said inlet end of said tank.

2. The poultry chiller of claim 1, wherein said first auger blade has a long pitch, wherein said long pitch of said first auger blade urges poultry carcasses forward from said inlet end of said tank when said auger rotates and causes poultry carcasses to rotate around said shaft when said auger rotates.

3. The poultry chiller of claim 2, wherein said long pitch of said first auger blade is in the range of 15-40 feet.

4. The poultry chiller of claim 1, wherein said tank comprises an auger section and an unloader section.

5. The poultry chiller of claim 4, wherein said auger section of said tank comprises said auger.

6. The poultry chiller of claim 4, wherein said unloader section of said tank comprises a plurality of unload paddles.

7. The poultry chiller of claim 4, wherein said unloader section of said tank comprises an unload chute.

8. The poultry chiller of claim 4, further comprising a baffle plate, wherein said baffle plate separates said auger section and said unloader section of said tank.

9. The poultry chiller of claim 4, wherein said unloader section of said tank is raised from said auger section of said tank.

10. The poultry chiller of claim 1, wherein said tank comprises a volume of chilled water, wherein said tank is filled with said volume of chilled water to a top of said tank.

11. A poultry chiller, comprising:
a tank for receiving poultry carcasses and holding chilled water, wherein said tank comprises an inner wall surface and an outer wall surface, wherein said tank comprises an inlet end and an outlet end; and
an auger mounted in said tank, wherein said auger comprises a plurality of long pitch auger blades, wherein said auger urges poultry carcasses forward from said inlet end of said tank when said auger rotates and causes poultry carcasses to rotate around said shaft when said auger rotates;
wherein said plurality of long pitch auger blades forms a plurality of spiral pockets between said plurality of auger blades and said inner wall surface of said tank.

12. The poultry chiller of claim 11, wherein said plurality of long pitch auger blades have a pitch in the range of 15-40 feet.

13. The poultry chiller of claim 11, wherein said plurality of auger blades comprises three auger blades.

14. The poultry chiller of claim 11, wherein said tank comprises an unloader section.

15. The poultry chiller of claim 14, wherein said unloader section of said tank comprises a plurality of unload paddles and an unload chute.

16. The poultry chiller of claim 11, wherein said tank comprises a volume of chilled water, wherein said tank is filled with said volume of chilled water to a top of said tank.

17. A poultry chiller, comprising:
a tank; and
an auger mounted in said tank, wherein said auger comprises a shaft and a first blade, a second blade, and a third blade, wherein said shaft has a first end and a second end, wherein said first blade spirals around said shaft from said first end to said second end, wherein said second blade spirals around said shaft from said first end to said second end, wherein said third blade spirals around said shaft from said first end to said second end.

18. The poultry chiller of claim 17, wherein said tank comprises an auger section and an unloader section.

19. The poultry chiller of claim 18, wherein said auger section of said tank has a first end and a second end, wherein said auger section of said tank comprises an inner wall surface, wherein said auger section of said tank comprises said auger, wherein said first blade, said second blade, and said inner wall surface of said tank forms a first spiral pocket that extends from said first end of said auger section to said second end of said auger section, wherein said second blade, said third blade, and said inner wall surface of said tank forms a second spiral pocket that extends from said first end of said auger section to said second end of said auger section, wherein said third blade, said first blade, and said inner wall surface of said tank forms a third spiral pocket that extends from said first end of said auger section to said second end of said auger section.

20. The poultry chiller of claim 19, wherein a poultry carcass in said first pocket is blocked from passing from said first pocket to said second pocket.

21. The poultry chiller of claim 19, wherein a poultry carcass in said first pocket is blocked from passing from said first pocket to said third pocket.

22. The poultry chiller of claim 18, wherein said poultry chiller is in communication with a control system, wherein said control system determines the amount of poultry carcasses to be removed from said poultry chiller by an unloader in said unloader section of said tank.

23. The poultry chiller of claim 17, wherein said first blade has a long pitch, wherein said long pitch is operable to force a poultry carcass to rotate around said shaft when said auger rotates.

24. The poultry chiller of claim 17, wherein said first blade, said second blade, and said third blade are substantially equally distant from one another around said shaft.

25. The poultry chiller of claim 17, wherein said first blade spirals at least one full revolution around said shaft, wherein said second blade spirals at least one full revolution around said shaft, wherein said third blade spirals at least one full revolution around said shaft.

* * * * *